3,089,527
PROCESS FOR INCREASING MILLING
YIELDS OF RICE
Theodore Wasserman, Berkeley, and Robert E. Ferrel, Richmond, Calif., assignors to the United States of America as represented by the Secretary of Agriculture
No Drawing. Filed Sept. 18, 1961, Ser. No. 139,003
3 Claims. (Cl. 146—221.7)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to methods of processing rice. A particular object of the invention is the provision of novel processes whereby to increase the milling yield of rice, that is, to obtain increased amounts of head rice and total rice from a given weight of rough rice. Further objects and advantages of the invention will be obvious from the following description wherein parts or percentages are by weight unless otherwise specified.

In preparing rice for the market, it is conventional practice to first dry the rough rice, or paddy, to a moisture content of about 12 to 13.5% and then mill it. In the milling operation the husk, germ, bran and aleurone layers are removed from the rice grains. The rice in this refined form is termed milled or white rice.

The milling operation requires application of abrasion and other mechanical forces with the result that a varying portion of the grains are broken. Thus, when a lot of rough rice is milled, the product will contain both (a) broken grains and (b) head rice, that is, unbroken grains. The total proportion of milled rice (heads and broken grains) obtained from a standard weight of rough rice is referred to as "total yield" and the proportion of head rice is referred to as "head yield."

Naturally, it is desirable that the milling operation produce a high total yield and especially a high head yield as the head rice is of much higher value than the broken grains. In practice, these yields are found to vary even between different lots of the same variety of rice. This variance has been attributed to various factors including methods of harvesting, degree of maturity when harvested, weather conditions prior to harvesting, etc. However, heretofore it has not been appreciated that the moisture content of the rough rice at the time of milling is a critical factor. We have found that moisture content is indeed a vital consideration and that increased total yield and head yield can be obtained by drying the rough rice, prior to milling, to a moisture content lower than that conventional in the industry. Our researches have shown that milling yield and moisture content are interdependent and as moisture content is decreased, the head and total yields are proportionately increased.

The objects of the present invention are attained by drying the rough rice—before it is subjected to milling— to a moisture level of 11.5% or less. Preferably, the rough rice is dried to a level of about 10 to 11%. The moisture level can be reduced as much as desired below these levels but ordinarily the moisture content is not decreased below 10% primarily because of the low rate of dehydration observed in eliminating further portions of the moisture in the grains and the possibility of cracking the rice grains during such extended drying.

The procedure employed to reduce the moisture content of rough rice may embody any of the conventional methods with, of course, the provision that the final moisture level is reduced below conventional levels as above indicated. For best results it is preferred that the drying be conducted under such conditions that damage to the rice is obviated. A preferred procedure, for example, is one in which the rice is subjected to heated air for an interval, then stored to permit equilibration of moisture content, then again subjected to drying, again stored, and so on. By repetition of these steps of drying and equilibration, the rice may be readily brought to the desired moisture content with minimum damage. In this type of drying, an important criterion—particularly after the moisture content has been reduced to about 14%— is that in each individual drying stage, the moisture content of the rice should not be reduced more than a decrement of about 1% of its total moisture content. Where this precaution is observed, high air temperatures can be used with correspondingly decreased times for each drying stage. Thereby, the drying system is utilized fully and efficiently and yet damage to the grain is kept at a minimum.

Subsequent to milling, the milled rice may be rehydrated to conventional moisture levels—about 12 to 13.5%—whereby the product may be sold on the same basis as conventionally processed rice. This rehydration may be accomplished by exposing the milled rice to humid air until the desired regain of moisture is attained. A special feature of this invention is that by such humid air treatment the rice is rehydrated without any damage. It would have been expected that such remoisturing of the product would lower the quality of the rice by causing cracking or chalking of the grains. However, it was found that when the milled rice is exposed to humid air to rehydrate it, there is no measurable degree of grain rupture, cracking, or chalking.

The invention is further demonstrated by the following illustrative examples.

*Example I*

A series of lots of rough rice (California Pearl) of different histories as to growing location, harvesting time, etc., were procured. Each lot was subjected to drying in the following manner. The rough rice was placed on a screen in a layer about 2 inches deep and relatively dry air at 75° F. was forced through it. Samples of the products were removed at intervals and tested for moisture content and assayed for total and head yield in a standard testing mill. A total of eight lots were tested and in each moisture contents were varied from 14.6 to 10%. It was found that on the average, increases in head yield and total yield of 1.8% and 1.2%, respectively, were obtained for every 1% decrease in moisture content in the range studied. Results for a typical lot in the series were as follows:

| Moisture content, percent | Head yield, percent | Total yield, percent |
|---|---|---|
| 13.4 | 61.9 | 72.1 |
| 10.0 | 68.2 | 75.4 |

*Example II*

Three 4000-bag lots of California Pearl rough rice, having an average moisture content of 13.1%, were procured. Each lot of rough rice was divided into halves. One-half of each lot was dried to 11.4% $H_2O$ in a conventional rice dryer in two passes with air at 120° F. using a feed rate of 1500 bags rice per hour.

The half-lots which had been reduced to 11.4% moisture and the half-lots which had not been further dried (13.1% moisture) were separately milled in commercial Engelburg mills on the same day.

The amount of head rice and broken grains obtained in each case were weighed for calculating the head and total yields. The average yields, based on the original rough rice at 13.1% moisture content, for each set of half-lots are tabulated below:

|  | Process in accordance with the invention | Conventional procedures |
| --- | --- | --- |
| Moisture content, percent | 11.4 | 13.1 |
| Head yield, percent | 49.2 | 47.4 |
| Total yield, percent | 67.6 | 69.2 |

It may be further observed that the head and total yields of the process of the invention are not truly demonstrated by the above data because these products contain less water than they normally would for entering regular channels of trade. Thus, if it is taken into account that the products are to be rehydrated to 13% moisture, then the results can be recalculated on the following equal basis:

|  | Process in accordance with invention (after rehydration to normal $H_2O$ level) | Conventional procedure |
| --- | --- | --- |
| Moisture content, percent | 13.1 | 13.1 |
| Head yield, percent | 50.2 | 47.4 |
| Total yield, percent | 68.9 | 69.2 |

*Example III*

Samples of California Pearl head rice having a moisture content of 12.4 were dehydrated to 11% moisture. This rice was then rehydrated in the following manners:

(A) One sample was allowed to stand in a room having an atmosphere of 70° F. and 65% relative humidity for 3 days. Moisture content of the rice was 12.6%.

(B) Another sample was placed on a screen and air at 70° F., 65% R.H. was blown through it for 2 days at a velocity of about 5 to 10 ft. per min. Moisture content of the rice was 11.9%.

(C) Another sample was treated as in B above except that the air velocity was 100 ft. per min. Moisture content of the rice was 12.7%.

Samples of the original rice and the rehydrated rice were put through a standard mill used for assaying rice for milling yields. This was not done to mill the grain but to subject it to abrasion and impact, thus to furnish a measure of possible fractures and cracks in the grains. In each case, the broken grains produced on milling were weighed to calculate the breakage. The results are tabulated below:

| Sample | Moisture content, percent | Breakage, percent |
| --- | --- | --- |
| Before dehydration | 12.4 | 5.0 |
| After rehydration, Method A | 12.6 | 5.2 |
| After rehydration, Method B | 11.9 | 5.2 |
| After rehydration, Method C | 12.7 | 5.5 |

As a further check, each of the four samples described above was subjected to measurement with a photometer and a color difference meter to determine the proportion of light transmitted and reflected by the samples. It was found that there were no measurable differences among the samples. It may be noted that had the rehydration caused chalking (development of opacity), this would have been registered as a sharp decrease in light transmittance.

*Example IV*

A batch of rough rice (Bluebonnet-50 variety) was placed in a rice dryer where it was subjected to air at 110° F. in cycles 3 minutes on and 27 minutes off; that is, 3 minutes of exposure to the hot air followed by equilibrating for 27 minutes, these cycles being repeated until the desired moisture levels were obtained. At intervals, samples of rice were removed, tested for moisture content and assayed for total and head yield in a standard mill used for appraising rice milling quality.

The results obtained are tabulated below:

| Moisture content of rough rice, percent | Head yield, percent | Total yield, percent |
| --- | --- | --- |
| 13.8 | 48.8 | 69.3 |
| 13.1 | 51.2 | 70.5 |
| 12.0 | 53.4 | 70.2 |
| 11.1 | 56.8 | 71.4 |
| 10.1 | 59.0 | 72.4 |

*Example V*

The procedure described in Example IV was applied to two other lots of Bluebonnet-50 rough rice of different growing and harvesting histories with the following results:

| Moisture content, percent | Head yield, percent | Total yield, percent |
| --- | --- | --- |
| LOT A—1959 CROP | | |
| 13.8 | 47.0 | 69.6 |
| 12.8 | 49.7 | 69.6 |
| 12.0 | 51.7 | 70.2 |
| 11.1 | 55.8 | 71.3 |
| 10.2 | 57.3 | 71.7 |
| LOT B—1958 CROP | | |
| 14.0 | 47.6 | 67.8 |
| 11.4 | 55.0 | 69.7 |
| 10.4 | 55.9 | 70.0 |

Having thus described the invention, what is claimed is:

1. A process for obtaining an increased yield of milled rice from rough rice which comprises drying the rough rice to a moisture level not to exceed 11.5% and milling it at said moisture level.

2. A process for obtaining an increased yield of milled rice from rough rice which comprises drying the rough rice to a moisture content of about 10 to 11% and milling it at said moisture level.

3. A process for obtaining an increased yield of milled rice from rough rice which comprises drying the rough rice to a moisture level not to exceed 11.5%, milling it at said moisture level, separating the milled rice and rehydrating it to a moisture content about from 12 to 13.5% by contacting it with humid air.

References Cited in the file of this patent

UNITED STATES PATENTS

| 82,238 | Moxey | Sept. 15, 1868 |
| 117,271 | Fitts | July 25, 1871 |
| 1,826,247 | Heppenstall | Oct. 6, 1931 |
| 2,413,472 | Sullivan | Dec. 31, 1946 |

FOREIGN PATENTS

| 16,523 of 1934 | Australia | Feb. 26, 1934 |